Patented June 24, 1952

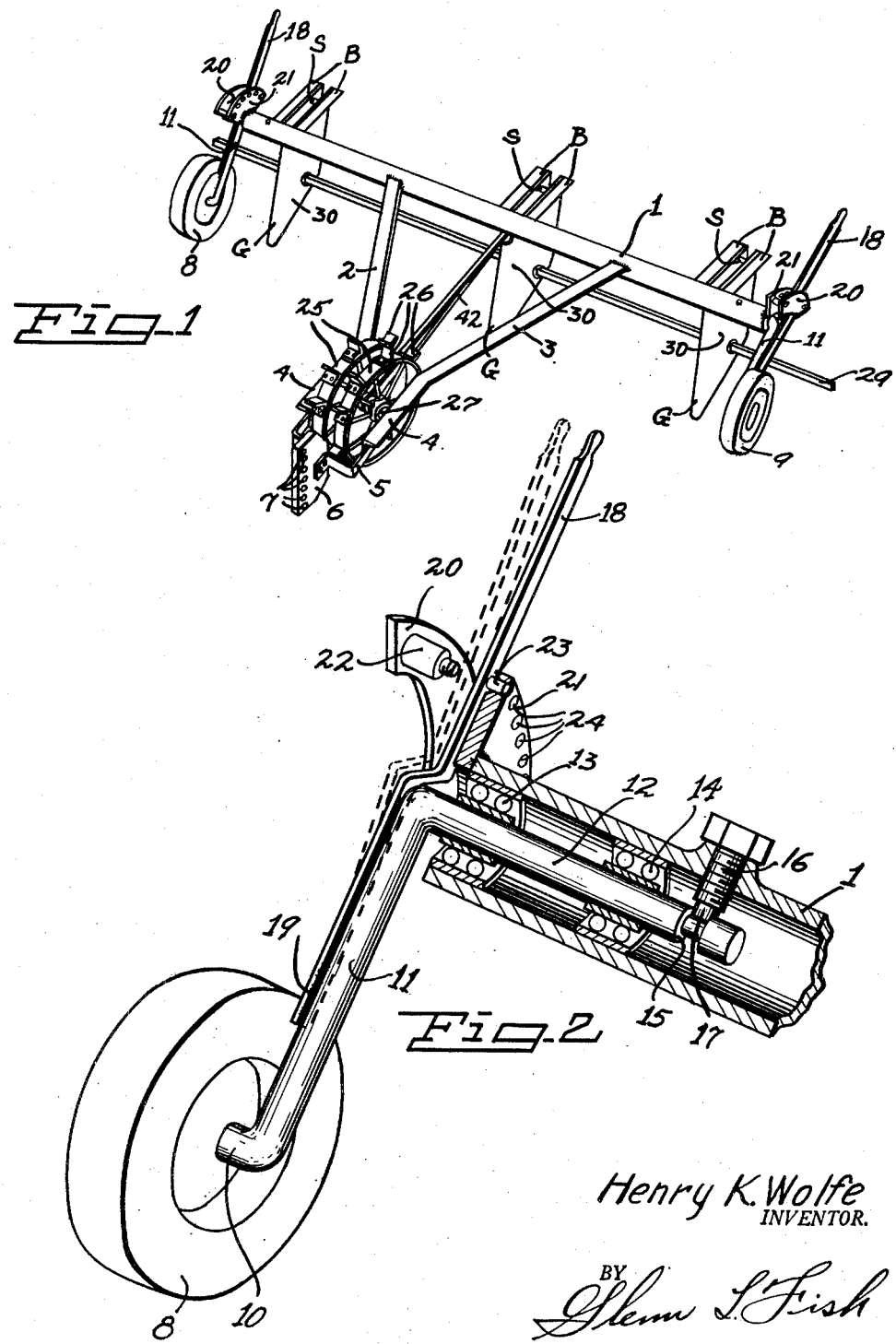

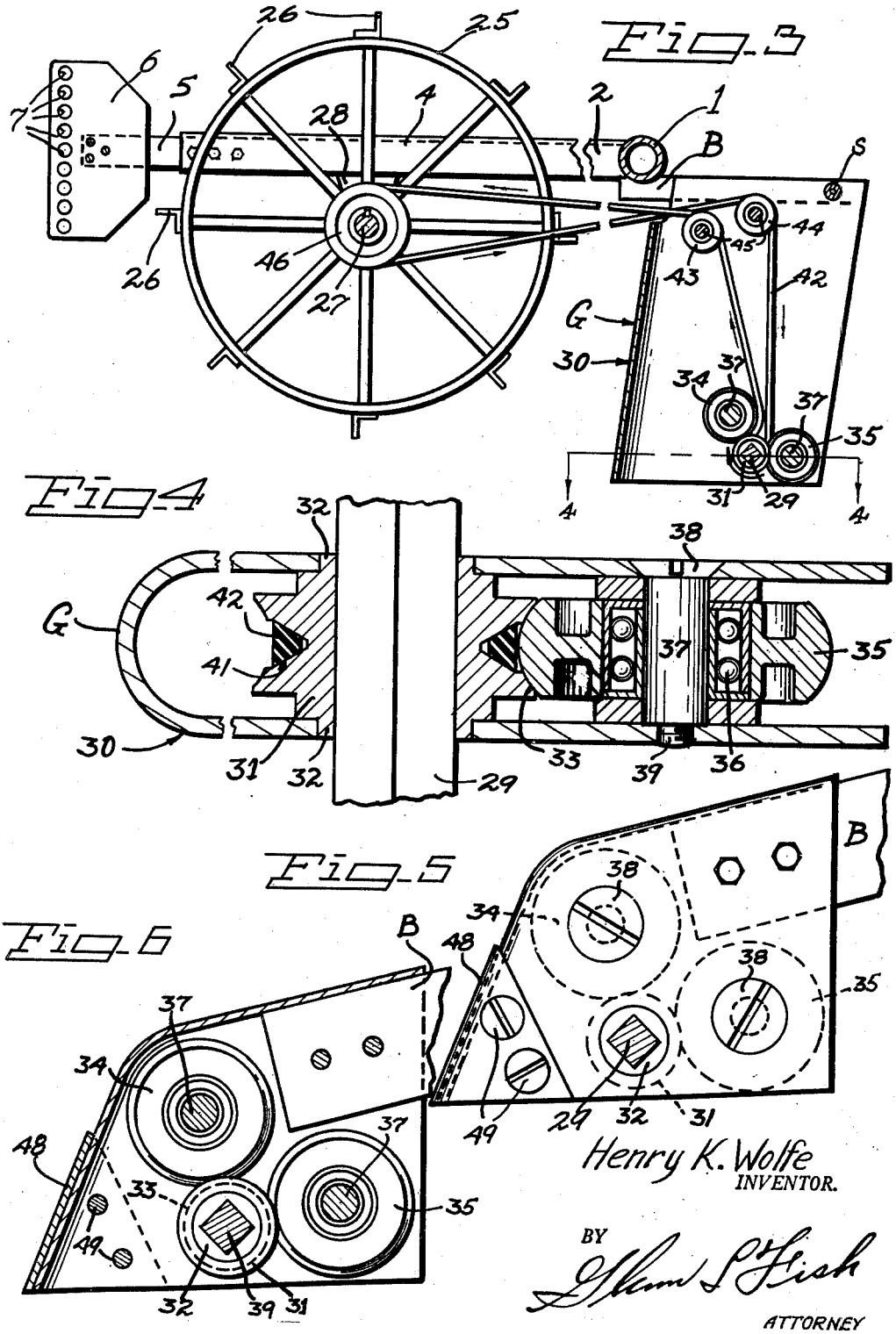

2,601,653

UNITED STATES PATENT OFFICE 2,601,653

ROTARY ROD WEEDER

Henry K. Wolfe, Spokane, Wash.

Application August 3, 1948, Serial No. 42,179

2 Claims. (Cl. 74—229)

The present invention relates generally to agricultural implements and more specifically to a rotary rod weeder, preferably of the three-wheel type that is adapted to be towed or hauled by a tractor or other automotive vehicle for uprooting growing weeds from a field, and employing a sub-soil or subterranean, power operated rotary rod and its shoes or housings, for this purpose. The invention involves certain improvements in the implement-operated driving mechanism in combination with the novel bearings for the weeder rod, together with means for vertically adjusting the rod to a desired depth in the subsoil, and means are provided for clearing weeds and trash from the bearing shoes, to facilitate operations of the weeder.

The invention consists in certain novel combinations and arrangements of part that may be manufactured with facility and low cost of production and assembled with convenience to provide a durable and reliable appliance, as will hereinafter be described and more particularly pointed out in the appended claims.

In the accompanying drawings I have illustrated a complete example of a physical embodiment of my invention wherein the parts are combined and arranged in accord with one mode I have devised for the practical application of the principles of my invention. It will however, be understood that changes and alterations are contemplated and may be made in these exemplifying drawings and mechanical structures, within the scope of my claims, without departing from the principles of the invention.

Figure 1 is a front perspective view of a rotary rod weeder in which my invention is physically embodied.

Figure 2 is an enlarged perspective view, partly in section, showing a portion of the assembly for an adjustable supporting wheel of the implement.

Figure 3 is a transverse vertical sectional view of the implement showing the operating wheel and the power transmission mechanism to one of the rod bearings.

Figure 4 is an enlarged detail horizontal sectional view at line 4—4 of Fig. 3.

Figure 5 is a view in side elevation of a modified form of bearing housing or shoe for the rotary rod; and Figure 6 is a vertical sectional view of the structure in Fig. 5.

In the preferred form of the invention shown in Fig. 1 I employ a main frame including a tubular cross beam or transversely extending beam or bar 1 having tubular ends to which are welded or otherwise secured the rear ends of a pair of radius bars 2 and 3 forming angle iron braces that terminate in parallel and spaced bearing bars 4, 4, united at their front ends by a yoke 5. A hitch or clevis 6 is mounted at the front end of the frame, and provided with a series of holes or sockets 7 for use in coupling a towing tractor or other propelling vehicle.

The frame is supported, and is vertically adjustable, by means of a right hand wheel 8 and a left hand wheel 9 mounted in the tubular ends of the beam 1, and as these wheel assemblies are of similar and complementary construction, a description of one assembly will suffice for both of them.

The wheel mount includes an angular member having a journal 10 for the wheel, as 8 in Fig. 2, and the journal projects laterally from an upright or post 11 that is fashioned with an angular or horizontal stub axle 12 extending into the open tubular end of the beam 1, and journaled in bearings 13 and 14 mounted within the tubular end of the beam. To prevent longitudinal displacement of the stub axle an annular groove 15 is cut near its inner end, and a bolt 16 is threaded through the tubular end of the beam with its smooth end 17 reduced and projecting into the groove.

For adjusting the weeder frame to locate the weeder rod in desired position in the sub-soil, each wheel mount is equipped with a hand lever 18 that is attached, as by welding at 19 to a post 11, and the free or unattached upper portion of the lever is resilient in order that it may be shifted laterally to couple and uncouple the wheel mount from the tubular end of the beam.

The lateral movement of the resilient or elastic hand lever is illustrated by dotted lines in Fig. 2, and its swinging movement, with the stub axle as a center, is guided between a pair of spaced arcuate guide flanges 20 and 21 rigid with the end of the tubular beam and spaced by washers and bolts 22. The lever is equipped with a laterally projecting coupling pin 23 for selective use with a series of sockets or holes 24 in the flange 21, by means of which the frame is retained in vertically adjusted position.

The implement, in addition to the two wheels 8 and 9, is supported by a ground wheel or operating wheels 25 having traction cleats 26 on their peripheries, and the axle 27 of the operating wheel is journaled in bearings 28 mounted on the bearing bars 4, 4 at the front center of the implement.

Power is transmitted from the operating wheel to a rotary weeder rod 29 that extends parallel with and below the main beam 1 of the implement frame, and is located at the rear of the wheels 8 and 9.

The rod, angular or square in cross section, is journaled to revolve in bearings mounted in a number of laterally spaced hollow shoes, or bearing housings 30, three being shown in Fig. 1; the housings being of general U-shape with curved front ends G forming guards, and open rear ends. Each housing is supported from the beam by a pair of rearwardly extending longitudinal arms B, B, of angle iron that are welded or otherwise rigidly attached to the cross beam 1, and the walls of the U-shape housings are united by spacers S to provide a rigid bearing structure for the rotary weeder.

The lower ends of the housings, with the rotary rod, plow through the sub-soil for uprooting the weeds, and the front ends or guards G clear the ground of weeds and trash to eliminate accumulation of trash that would impede the work of the rotary rod.

Within each housing or shoe is mounted a bearing roller 31 having an angular or square bore fitted on the rod, and this roller is provided with short circular trunnions 32, 32 that are journaled in the spaced walls of the housing to provide smooth bearings for the rotary rod. For bracing the bearing rollers against strains and stresses each roller is provided with an annular exterior groove 33, and a pair of spaced idlers or retaining rollers 34 and 35 having rounded convex peripheries for frictional bearing on the grooved bearing roller, are journaled at 36 in the walls of the shoe for this purpose. The bearings 36 are mounted upon the journals or shanks 37 of screw bolts having heads 38 seated in countersunk bores of the shoes, and the threaded reduced ends 39 of the bolts are threaded in an opposed wall of the shoe.

Power and motion are transmitted from the operating wheels 25 to the bearing roller 31 that is mounted in the central or intermediate shoe or bearing housing, and this driven roller with its groove 33 is also fashioned with an inner V-groove 41 within the groove 33, around which V-groove a power transmitting belt 42 passes. Within the upper portion of the shoe are journaled two guide pulleys 43 and 44 having journals 45, and the two laps of the endless belt pass over these guide pulleys to a drive pulley 46, keyed to axle 27 of wheels 25.

In Figs. 5 and 6 the braced bearing assembly for the rotary rod is illustrated as mounted in a modified form of shoe or housing that is supported on the end of the frame member B, and the housing is equipped with a front wear plate 48 bolted at 49 to the housing. The bearing assembly is thus capable of being mounted in other types of housings or shoes, and it operates with equal efficiency in the performance of its functions of bracing the rotary weeder rod.

In addition to vertically adjusting the weeder rod to selected working position, the hand levers 18 are also utilized for elevating the weeder to inoperative position above the ground level for transporting the implement to and from the field.

In lieu of the endless V-belt and its pulleys, a sprocket chain and sprocket wheels or rollers may be substituted, for transmitting power from the operating wheel to the rotary weeder rod, and other changes may be made in the illustrated implement without departing from the principles of my invention.

Having thus fully described my invention, what I claim as new and desire to secure by Letters Patent is:

1. In a rotary rod weeder including a rotatable rod and a shoe through which the rod passes; mechanism for transmitting rotary motion to the rod comprising a drive pulley mounted about the rod within the shoe and held for rotary movement with the rod, said pulley having a concaved marginal edge face transversely arcuate and being formed with a circumferentially extending groove midway the width of the said edge face, pressure rollers rotatably mounted in the shoe in spaced relation to each other circumferentially of the drive pulley and having marginal edge faces arcuate and convexed in cross section and having portions fitting into the concaved edge face of said drive pulley in bridging relation to the groove, guide pulleys rotatably mounted in said shoe and spaced upwardly from the pulley and the pressure rollers, and a belt extending into the shoe and engaged about the guide rollers and extending downwardly therefrom with its lower end looped about the concaved edge face of the drive pulley and held in the groove thereof in gripping engagement with walls of the groove by the portions of the pressure rollers fitting into the said concaved edge face of the drive pulley and engaging the belt.

2. Mechanism for transmitting rotary motion to a rotatable shaft comprising a drive pulley mounted about the shaft and held for rotation with the shaft, said pulley having a concaved marginal edge face arcuate in cross section and being formed with a circumferentially extending V-shaped groove intermediate the width of the concaved edge face, pressure rollers rotatably mounted and spaced from each other circumferentially of the drive pulley and formed with convexed edge faces arcuate in cross section and having portions fitting snugly into the concaved edge face of the drive pulley in bridging relation to the groove thereof, and a belt having a portion engaged with the edge faces of the pressure rollers and looped about the edge face of said drive pulley and held in the V-shaped groove thereof in gripping engagement with side walls of the groove by the portions of the pressure rollers fitting into the concaved edge face of the drive pulley and engaging the outer side portion of the belt.

HENRY K. WOLFE.

REFERENCES CITED

The following references are of record in the file of this patent:

UNITED STATES PATENTS

| Number | Name | Date |
| --- | --- | --- |
| 1,791,379 | Riggs | Feb. 3, 1931 |
| 1,803,186 | Hendrickson | Apr. 28, 1931 |
| 1,973,985 | Johnson et al. | Sept. 18, 1934 |
| 2,125,359 | Scarlett | Aug. 2, 1938 |
| 2,190,091 | Wolfe | Feb. 13, 1940 |
| 2,332,617 | Tuft et al. | Oct. 26, 1943 |
| 2,450,322 | Williams | Sept. 28, 1948 |